Inventor
ROY H. MUMMA
By Marechal & Biebel
ATTORNEYS

Aug. 30, 1955     R. H. MUMMA     2,716,369
MACHINE TOOL CONSTRUCTION
Filed Aug. 18, 1950     4 Sheets-Sheet 2
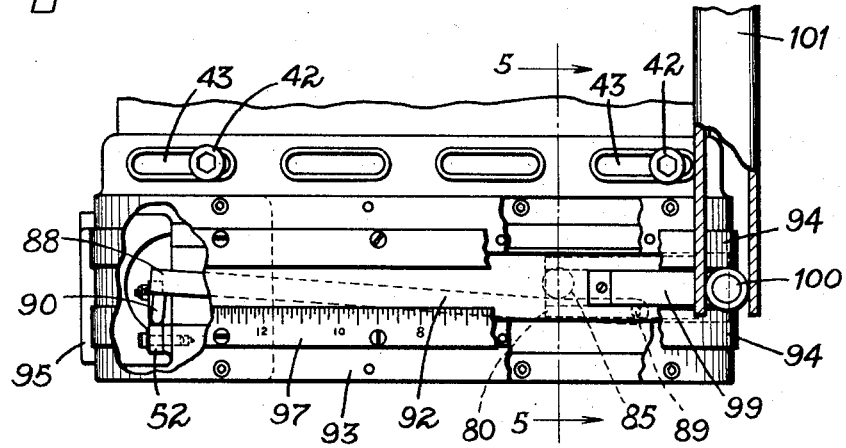
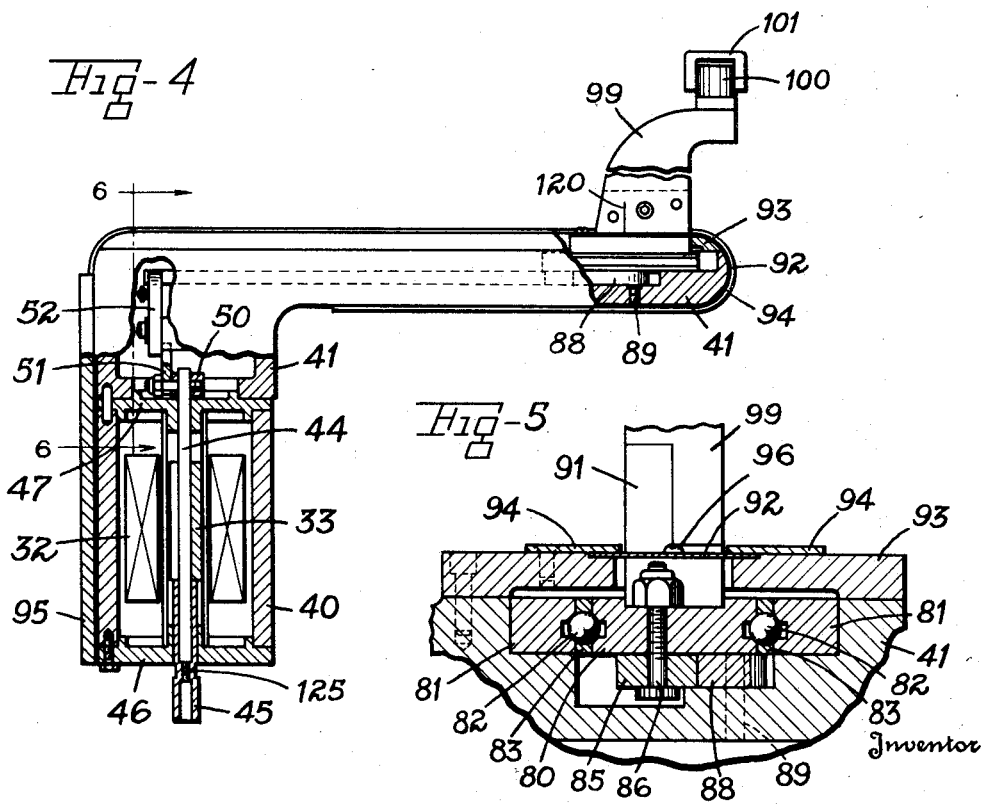
ROY H. MUMMA
ATTORNEYS

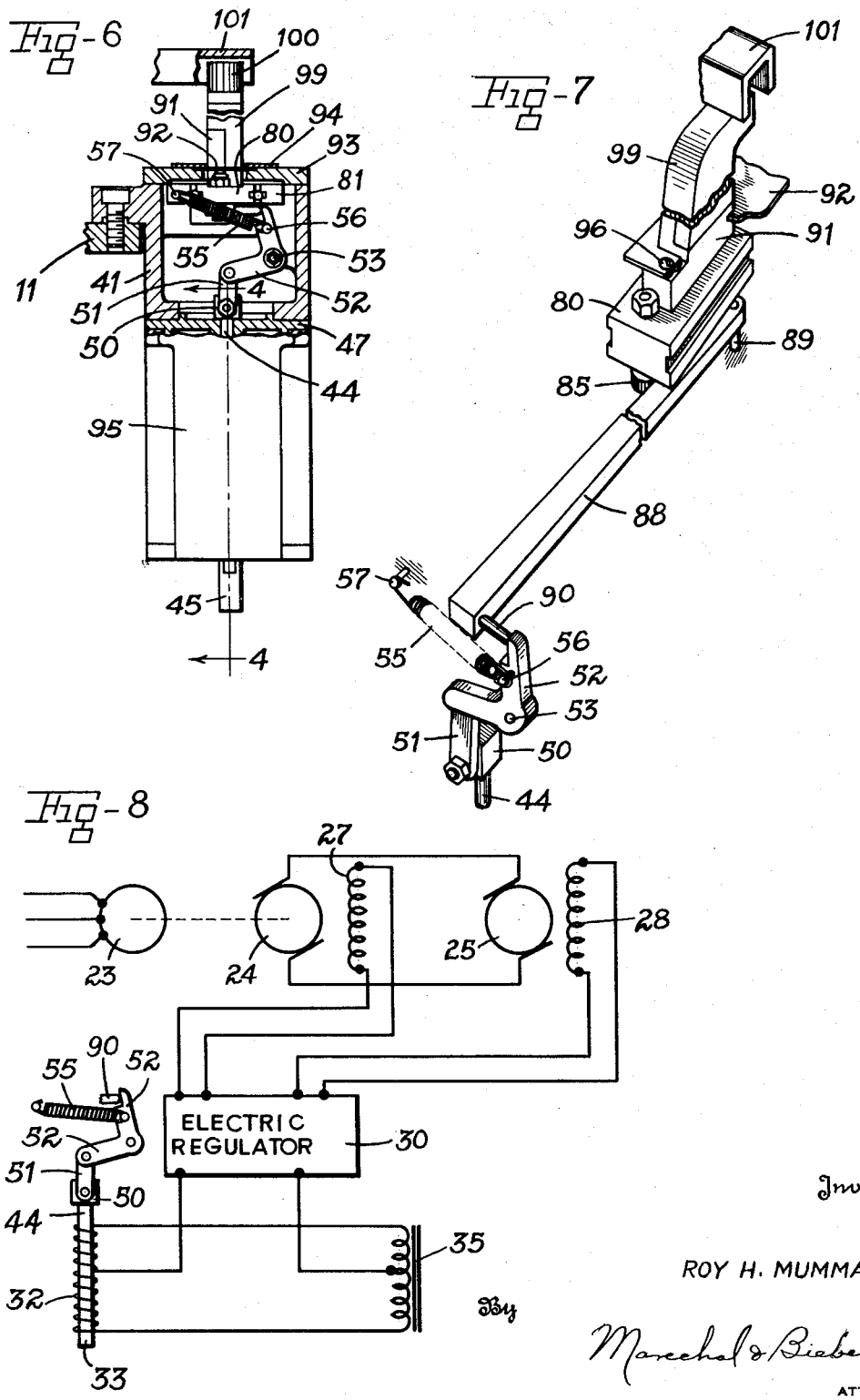

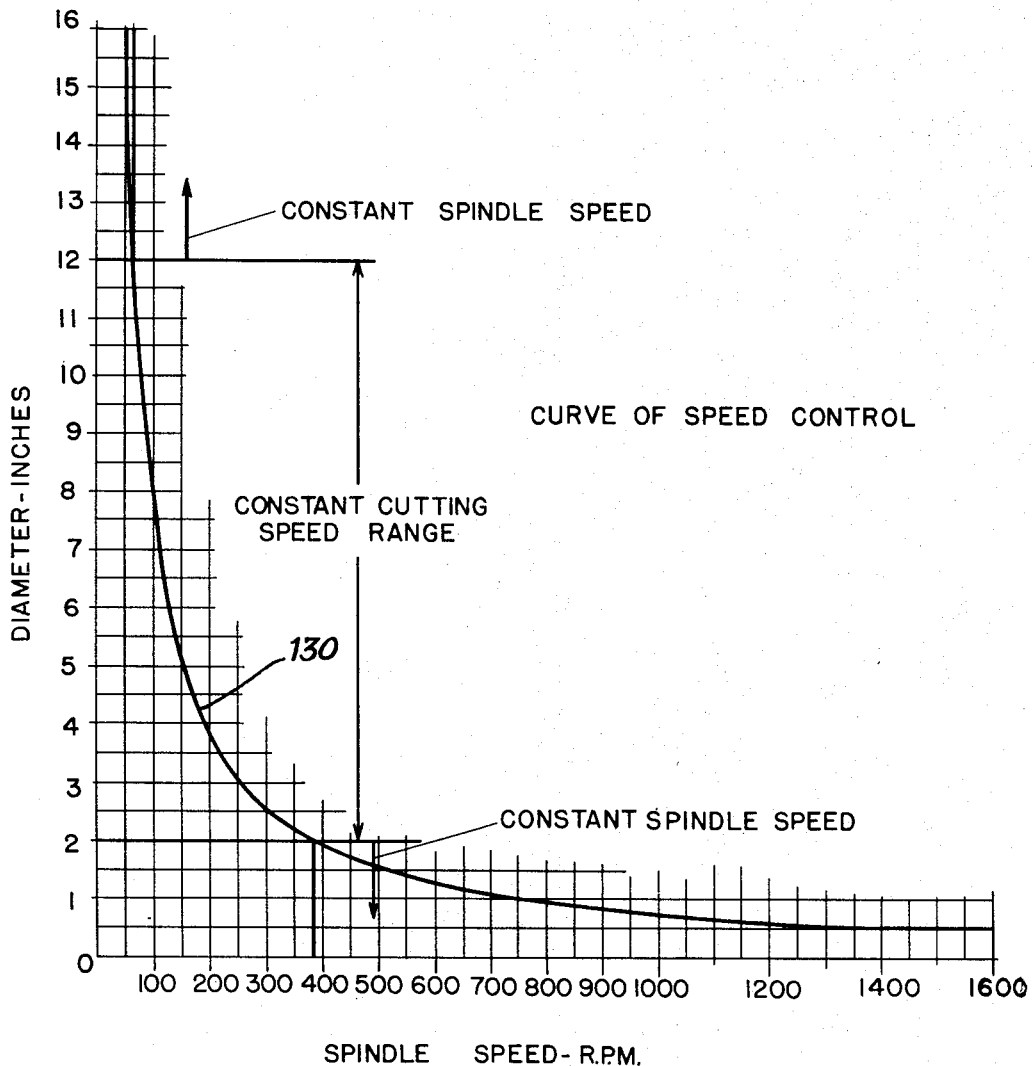

United States Patent Office 2,716,369
Patented Aug. 30, 1955

2,716,369

MACHINE TOOL CONSTRUCTION

Roy H. Mumma, Springfield, Ohio, assignor to The Springfield Machine Tool Co., Springfield, Ohio, a corporation of Ohio Application August 18, 1950, Serial No. 180,155

13 Claims. (Cl. 82—24)

This invention relates to lathes, and more particularly to the automatic control of the cutting speed of a lathe.

In any turning operation, the actual cutting speed is the peripheral speed of the portion of the workpiece in contact with the cutting tool, and for a given angular speed, this cutting speed will depend upon the diameter of the peripheral portion of the workpiece being turned. If the cutting speed is to be maintained substantially uniform, it is necessary to reduce the speed of rotation of the workpiece when its diameter is increased during the turning operation, and with modern high speed cutting tools, such as carbide tools, it is important that the cutting speed be maintained within a fairly narrow range of optimum results are to be maintained from the standpoint of tool life, finish and maximum production.

The present invention is particularly directed to the provision of a control for maintaining a constant cutting speed during a lathe operation such as contour turning wherein it is not only desirable to advance the cutting tool towards the work at an acute angle to the lathe axis, instead of normally to the axis as in the usual turning operation, but also the angular relation between the lathe axis and the path of movement of the tool may require adjustment over a substantial range for preferred results. In such an operation, the actual or radial extent of movement of the tool toward the lathe axis for a given movement towards the workpiece depends upon the angular relation of the tool path and the lathe axis, and the present invention provides a control mechanism particularly adapted for this type of operation which functions by sensing the actual spacing of the tool from the lathe axis and varying the drive speed accordingly, and which also is quickly and easily adjusted to the particular angle between the lathe axis and the path of movement of the tool for a given cutting step.

It is one of the primary objects of the invention to provide a control mechanism of this character for the cutting speed of a lathe which is simple to construct and reliable in operation, which is readily adjusted for a turning operation wherein the path of movement of the tool is at an acute angle to the axis of rotation of the workpiece, and which will maintain a substantially constant cutting speed over a wide range of diameters of the workpiece.

It is also an object of the invention to provide a control mechanism of this character in the form of a relatively simple attachment for an existing lathe which is readily installed without requiring rebuilding or revision of the lathe structure and which is readily adjustable in accordance with the angular relation of the lathe axis and the path of movement of the tool to maintain a substantially constant cutting speed throughout a turning operation.

Other objects and advantages will be apparent from the following description, the accompanying drawings and the appended claims.

In the drawings—

Fig. 3 is a plan view, partly broken away, showing the control mechanism mounted on the lathe;

Fig. 4 is a view partly in side elevation and partly in vertical section on the line 4—4 of Fig. 6;

Fig. 5 is an enlarged fragmentary section on the line 5—5 of Fig. 3;

Fig. 6 is a view at right angles to Fig. 4 and taken partly in elevation and partly in section on the line 6—6 of Fig. 4;

Fig. 7 is a diagrammatic view in the nature of a perspective showing the operative relation of certain parts of the control mechanism;

Fig. 8 is a wiring diagram; and

Fig. 9 is a graph illustrating the operation of a lathe having a constant cutting speed control in accordance with the invention.

The control mechanism of the invention may be employed in conjunction with any suitable variable speed control for the main drive of a lathe which is adjustable over the desired operating range of diameters and which is capable of sufficiently linear or stepless variation for accurate contour turning. A movable member is provided for sensing the actual distance of the cutting point of the tool from the lathe axis, and this member is mounted for movement in a fixed path, which may conveniently be normal to the lathe axis, and is provided with an operating connection with the variable speed control to adjust the drive speed in accordance with the radial distance of the tool from the lathe axis. However, when the path of movement of the tool is at an angle to the lathe axis, the tool will cover a greater linear distance than its actual extent of movement measured radially of the lathe axis, and accordingly an operating member is provided between the tool support and the movable control member which is adjustable in accordance with the angular path of movement of the tool in such manner that the desired speed control is maintained for a given contouring operation.

Figure 1:
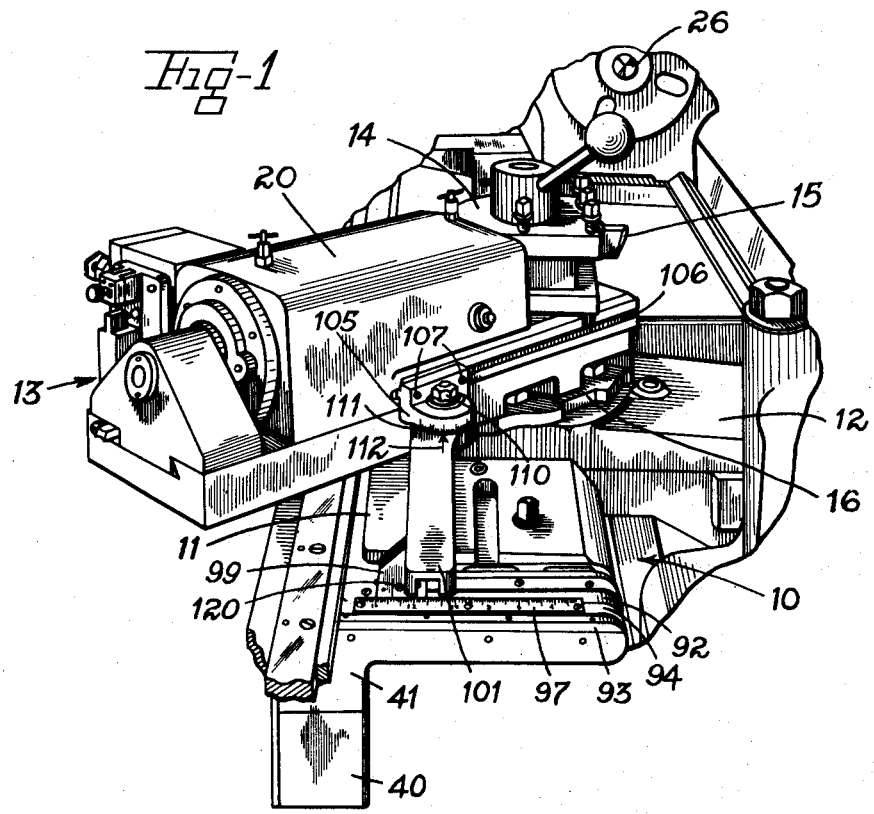
Fig. 1 is a perspective view showing a fragment of a lathe equipped with the speed control mechanism of the invention.
Figure 2:
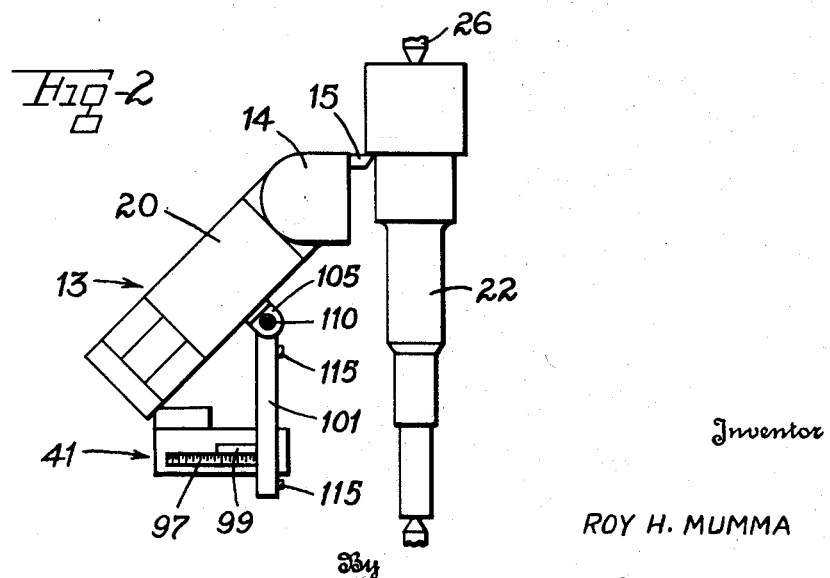
Fig. 2 is a somewhat diagrammatical plan view illustrating the operation of the invention for contour turning.

Referring to the drawings, which illustrate a preferred embodiment of the invention, the lathe shown fragmentarily in Figs. 1 and 2 includes a bed indicated at 10 and a carriage 11 which supports the usual cross slide 12. The lathe is shown as equipped with a hydraulically operated contouring attachment indicated generally at 13, which includes the holder 14 for the tool 15 and which is mounted on the bottom slide 12 by means of a swivel connection 16 in place of the usual compound rest. This attachment 13 can accordingly be set at a desired angle to the lathe axis, and it includes a hydraulic cylinder 20 for actuating the tool holder along a path of movement which depends upon the particular angular setting of the attachment on the cross slide 12 to carry out a contour turning operation on a workpiece such as is indicated at 22 in Fig. 2.

The drawings illustrate the invention in connection with an electric drive of the Ward Leonard type which includes a variable voltage motor generator having an electronic field control. For convenience of illustration, the invention is shown in the drawing, and particularly in the wiring diagram in Fig. 8, in connection with the Westinghouse AV Drive which includes an A. C. motor 23 driving a D. C. generator 24 which in turn operates the D. C. motor 25 providing the actual drive for the lathe spindle 26. The field coils 27 and 28 for the generator and D. C. motor respectively are connected with an electronic control indicated diagrammatically at 30, which is in turn controlled by a reactor comprising a coil 32 having an armature 33 suspended in its field but having no physical contact with the coil, the reactor being balanced by a transformer 35. With this arrangement, axial variation of the position of the armature 33 in the field of the coil 32 produces the desired variation in the speed of the D. C. motor 25, thus giving a substantially linear speed control with no wear and low maintenance.

The reactor unit 32—33 is mounted in a housing 40 depending from a control box 41 adjustably mounted on the wing of the lathe carriage 11 by means of the bolts 42 in slots 43. The armature 33 is carried by a rod 44 having an adjusting member 45 threaded on its lower end to locate the armature in the desired position with respect to the coil 32 in the initial calibration of the control mechanism. The adjusting member 45 is slidable through the bottom cover 46 of the housing 40 and the rod 44 is slidable at its upper end through the top cover 47 for housing 40.

The upper end of the rod 44 is secured within a clamp 50 which includes a shank forming a pivotal connection to a link 51 which is in turn pivoted to one end of a bell crank 52 pivoted at 53 to a boss in the control box 41. A spring 55 normally biases the bell crank in counterclockwise direction as viewed in Fig. 6 to move the armature 33 downwardly and thus to adjust the variable speed control for the maximum drive speed, the spring 55 being connected to a pin 56 on the bell crank and a pin 57 fixed in the control box 41.

The mechanism for sensing the actual position of the tool with respect to the lathe axis and for adjusting the drive speed accordingly includes a slide 80 mounted for sliding movement in the control box 41 by means of a pair of guide ways 81 and a plurality of balls 82 and retainers 83. The slide 80 has a roller 85 pivoted to its underside by means of a bolt 86, and this roller engages a bar shaped cam 88 pivoted within the control box by a bolt 89 and provided at its opposite end with a pin 90 positioned to engage the upper arm of the bell crank 52.

A block 91 is bolted to the slide 80 and extends upwardly therefrom, and in order to seal the interior of the control box against dust and the like, a flexible sealing strip 92 is arranged to extend over the slot in the control box cover 93 through which the block 91 extends. The sealing strip 92 is guided and held by seal strips 94 which fit around the upper part of the control box and are covered at their outer ends by a plate 95 bolted to the control box 41 and housing 40. The flexible strip 92 has a cutout to receive the block 91 therethrough, and it is secured to the block by a screw 96 for movement therewith as the slide 80 moves back and forth in the control box. A scale 97 is secured to the cover 93 for reference in setting the control mechanism as described hereinafter and is graduated in inches of diameter of the workpiece.

As shown, the arrangement of the bell crank linkage is such that as the slide 80 moves outwardly with respect to the lathe axis, the roller 85 moves the cam 88 about its pivot 89 in counterclockwise direction as viewed in Fig. 3, and the cam acts through pin 90 to rock the bell crank against spring 55 and thus to raise the rod 44 and armature 33 and to reduce the drive speed accordingly. An operative connection is provided between the slide and the contour attachment 13 for adjusting the position of the slide 80 in accordance with the radial distance of the tool 15 from the lathe axis. This connection includes a follower 99 bolted to the block 91 and provided with a roller 100 at its upper end which engages within a channel in the underside of a control arm 101 carried by the cylinder 20 on the contour attachment 13.

The connection between the control arm 101 and cylinder 20 includes an adjustable bracket 105 slidable within a T-slot 106 in the side of the cylinder and provided with lock screws 107. The control arm 101 is pivoted to bracket 105 by a bolt and nut 110 which may be tightened to lock the control arm in desired angular relation with the cylinder 20 in accordance with the angular setting of the contour attachment. For optimum accuracy when the movement of the slide 80 is directly radially of the lathe axis, the control arm 101 should be precisely parallel with the lathe axis. The setting of the control arm is facilitated by a scale 111 on the bracket 105, this scale being readily calibrated in accordance with the angular setting of the contour attachment and the control arm being provided with a suitable index mark 112. The control arm may also be formed with indicator buttons 115 as shown in Fig. 2 to facilitate accurate measurement of the degree of parallelism of the control arm with the lathe axis where extreme precision is required.

In setting up the control mechanism for a given contouring operation, the first step is to set the contouring attachment 13 at the desired angle with respect to the lathe axis. The control arm 101 is then set in parallel relation with the lathe axis by adjustment on its pivot bolt 110, with the bolt then being tightened to hold the arm in its adjusted position. The carriage and cross slide are then set with the tool in position to the smallest diameter to be turned, and with the follower roller 100 engaged within the control arm channel, the bracket 105 is adjusted in the slot 106 until the index mark 120 (Fig. 4) on the follower 99 coincides with the graduation on the scale 97 corresponding to twice the actual radial distance of the tool from the lathe axis. After the lock screws 107 on the bracket have been tightened, the mechanism is ready for use.

During the contouring operation, which may be carried out automatically by means of a suitable template or by manual control, movement of the cylinder 20 and tool 15 with respect to the lathe axis will cause corresponding movement of the control arm 101, and this in turn will cause radial movement of the follower 99 and slide 80. As the slide moves, the roller 85 thereon engages the cam 88 and causes it to pivot about the pivot pin 89, and the resulting movement of the bell crank 52 through pin 90 will raise or lower the rod 44 and armature 33 for corresponding variation of the drive speed. Throughout the operation, although the movement of the tool and tool support may be at an acute angle to the lathe axis, the actual radial distance of the tool from the lathe axis will at all times be sensed by the follower 99 for proper control of the drive speed to give the desired uniform cutting speed in accordance with the diameter of the peripheral portion of the work piece being turned.

The cam 88 is provided for the purpose of compensating for variations which may exist in the control system from truly linear speed adjustment in accordance with the radial movement of the tool. The particular configuration of the cam may accordingly vary for different installations, and it is desirable that the cam be individually calibrated for the lathe on which it is installed. Calibration of the cam is readily carried out by first setting the slide at a definite position, for example for a 2-inch diameter cut, and then by means of an adjusting screw moving the cam blank until the proper spindle speed is obtained. The position of the cam follower roller 85 is then transferred to the cam blank, and this operation is repeated in small increments such as ¼ inch in diameter over the full range for which uniform control is desired. The resulting curve is then drawn and cut on the cam, thus readily combining the theoretical constant speed curve and the reactance curve of the particular control system to give a cam of the proper shape.

It will be seen that the construction of the invention provides for adjustment of the control arm 101 along substantially the entire length of the tool support as well as angularly thereto, thus allowing for the use of tools of different length and for different angular settings of the tool support. The control arm is set parallel to the lathe axis regardless of the angular setting of the tool support, with the graduations which are provided on the control arm and bracket making it necessary to merely set the arm to the same setting as the tool support itself. Essentially therefore, the unit operates by maintaining a right-angled triangle, in which the control arm 101 is the base side, the cam follower slide 80 defines the perpendicular side, and the tool slide forms the hypotenuse.

The invention makes it possible to provide constant cutting speed over any desired working diameter range of a lathe, although for practical purposes it is usually not necessary to include small diameters such as two inches or less, and usually also it is not practical to contour at diameters greater than within one or two inches of the maximum working diameter of a given lathe. For example, in a lathe having a maximum working diameter of fourteen inches, satisfactory results have been obtained in accordance with the invention with the cam 88 formed to provide a constant cutting speed over a diameter range of from two to twelve inches, with the end portions of the cam being straight so that no speed adjustment results from movement of the slide 80 at these end portions of the cam, giving a constant spindle speed at these extreme diameters.

The graph in Fig. 9 illustrates a typical installation of the invention in a lathe equipped with a Westinghouse AV Drive giving constant horsepower over a speed range of six to one. The curve 130 represents the constant cutting speed, and it will be seen that it is a simple curve which runs to infinity at each end. This curve is the same for any cutting speed, since it is merely graphical expression of a quadratic equation, and it is applicable to any lathe. For a particular cutting speed, if the diameter is doubled then the spindle speed is halved.

As stated, with the graph in Fig. 9 applied to a fourteen-inch lathe equipped with the speed control of the invention, constant cutting speed is obtained over the entire range of working diameters from two to twelve inches as shown. Similarly there is a constant spindle speed in the diameter range from zero to two inches, and also a constant spindle speed at diameters greater than twelve inches, this constant spindle speed in each case being equal to the spindle speed established by the control of the invention at the two extremes of the constant cutting speed range.

The control mechanism of the invention as shown is not only applicable to installations where the working diameter varies towards its maximum by moving toward the front of the lathe, but it is equally applicable to converse installations in which it is desired to bore on the back side of the work. The same controls may be used as described by merely changing the position of the armature 33 in the field of the reactor coil 32. In the normal installations, the armature is moved out of the field when the tool slide moves to a larger diameter or toward the front of the lathe. For turning or boring on the back side of the lathe, the diameter decreases as the tool slide moves outwardly, and for such installations the armature is mounted to move into the field as the tool slide moves toward the front of the lathe.

Referring to Fig. 4, in normal installations the armature 33 is so positioned on rod 44, by means of the adjusting member 45, that it is near the top of the coil 32, so that upward movement of the rod moves the armature out of the field. As shown, however, the adjusting member 45 is longer at one end of its threaded intermediate portion 125 than the other, and in order to reverse the action of the control, it is merely necessary to reverse the position of the adjusting member on the rod 44. When this is done, the armature 33 drops to the lower portion of the coil 32 so that upward movement of rod 44 causes it to move into the field and increase the drive speed. It has been found that with the construction as shown, the control mechanism will operate satisfactorily for either type of installation, the only change required being to cut a different cam as described above in accordance with the particular lathe installation.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for maintaining a constant cutting speed on a workpiece in a lathe including a drive for rotating said workpiece about an axis with respect to a cutting tool, comprising a variable speed control for said drive, a support for said tool mounted on said lathe for movement towards and away from said axis, means for changing the angular relation between said axis and the path of movement of said tool support, means for sensing the radial distance of said tool from said axis, means operated by said sensing means for adjusting said control in accordance with the radial distance of said tool from said axis, and means for changing the relationship of said sensing means and said tool in correlated relation with changes in the angular relation between said axis and the path of movement of said tool support to cause said sensing means to move radially with respect to said axis at a rate substantially equal to the radial component of the rate of the corresponding movement of said tool support along each selected said angular path.

2. Apparatus for maintaining a constant cutting speed on a workpiece in a lathe including a drive for rotating said workpiece about an axis with respect to a cutting tool, comprising a variable speed control for said drive, a support for said tool mounted on said lathe for movement towards and away from said axis, means for changing the angular relation between said axis and the path of movement of said tool, a member mounted on said lathe for radial movement towards and away from said axis, means operated by said movable member for adjusting said control in accordance with the radial spacing of said member from said axis, an operative connection between said movable member and said tool support for effecting radial movement of said member with respect to said axis in response to movement of said support with respect to said axis, and means for adjusting said connection in correlated relation with the angular relation of the path of movement of said tool support and said axis to cause said movable member to move radially towards said axis at a rate substantially equal to the radial component of the rate of movement of said tool along said angular path.

3. Apparatus for maintaining a constant cutting speed on a workpiece in a lathe including a drive for rotating said workpiece about an axis with respect to a cutting tool, comprising a variable speed control for said drive, a support for said tool mounted on said lathe for movement towards and away from said axis, means for changing the angular relation between said axis and the path of movement of said tool supporting means for sensing the radial distance of said tool from said axis, means supporting said sensing means for movement towards and away from said axis along a radial path with respect to said axis, means including a cam forming an operative connection between said sensing means and said control to adjust said control in accordance with the radial distance of said sensing means from said axis, the contour of said cam being coordinated with said control to provide substantially linear adjustment of said drive speed in accordance with the movement of said sensing means, means operatively connecting said sensing means with said tool support, and means for adjusting said connecting means in correlated relation with the angle between said axis and said path of movement of said tool support to cause said sensing means to move radially towards said axis at a rate substantially equal to the radial component of the rate of movement of said tool support along said path thereof.

4. Apparatus for maintaining a constant cutting speed on a workpiece in a lathe having a variable speed drive and including a tool and tool support movable at a selected angle with respect to the lathe axis and provided with means for changing said angle, comprising a follower, means supporting said follower for movement radially of said lathe axis, a control arm, an adjustable mounting for said arm on said tool support providing for parallel alignment of said arm with said lathe axis when the path of movement of said tool support is at an angle to said lathe axis, means operatively connecting said follower with said arm for movement radially of said lathe axis in response to movement of said arm with said tool support to sense the radial distance of said tool from said axis, and means forming an operative connection between said follower and said variable speed drive for adjusting the drive speed in accordance with the radial position of said follower with respect to said lathe axis.

5. Apparatus for maintaining a constant cutting speed on a workpiece in a lathe having a variable speed drive and including a tool and tool support movable at a selected angle with respect to the lathe axis and provided with means for changing said angle, comprising a follower, means mounting said follower on said lathe for movement along a fixed path with respect to said lathe axis, a control arm carried by said tool support, means for adjusting said arm to parallel alignment with said axis in accordance with the angular relation of said axis to the path of movement of said tool support, means operatively connecting said follower with said arm for movement of said follower in response to movement of said tool support to coordinate the radial spacing of said follower and said axis with the radial position of said tool, and an operative connection between said follower and said variable speed drive for adjusting the drive speed in accordance with the movements of said follower.

6. Apparatus for maintaining a constant cutting speed on a workpiece in a lathe having a variable speed drive and including a tool and tool support movable at a selected angle with respect to the lathe axis and provided with means for changing said angle, comprising a follower, means mounting said follower on said lathe for movement along a fixed path with respect to said lathe axis, a control arm carried by said tool support, means for adjusting said arm to parallel alignment with said axis in accordance with the angular relation to said axis of the path of movement of said support, means operatively connecting said follower with said arm for movement of said follower in response to movement of said tool support, means for adjusting said arm on said tool support radially of said axis in accordance with the initial radial setting of said tool, and an operative connection between said follower and said variable speed drive for adjusting the drive speed in accordance with the movements of said follower.

7. Apparatus for maintaining a constant cutting speed on a workpiece in a lathe having a variable speed drive and including a tool and tool support movable at a selected angle with respect to the lathe axis and provided with means for changing said angle, comprising a follower, means mounting said follower on said lathe for movement along a fixed path with respect to said lathe axis, a control arm carried by said tool support, means for adjusting said arm to parallel alignment with said axis in accordance with the angular relation to said axis of the path of movement of said support, means operatively connecting said follower with said arm for movement of said follower in response to movement of said tool support, and means including a cam forming an operative connection between said follower and said variable speed drive for adjusting the drive speed in accordance with the radial position of said follower, the contour of said cam being coordinated with said variable speed drive to effect substantially linear adjustment of the drive speed corresponding to the movement of said follower.

8. In a lathe having a variable speed drive and a support for a tool adjustably mounted on said lathe for movement towards and away from the lathe axis at a selected angle and provided with means for changing said angle, the combination of operating means for said variable speed drive including a follower mounted on said lathe for movement along a fixed path with respect to said lathe axis, a control arm for operating said follower, an adjustable mounting for said arm on said tool support providing for alignment of said arm in parallel relation with said lathe axis in accordance with the angular relation to said axis of the path of movement of said support, and means for adjusting said arm on said tool support radially of said axis in accordance with the initial radial setting of said tool.

9. In a lathe having a variable speed drive and a support for a tool adjustably mounted on said lathe for movement towards and away from the lathe axis at a selected angle and provided with means for changing said angle, the combination of operating means for said variable speed drive including a follower mounted on said lathe for movement along a fixed path with respect to said lathe axis, a control arm for operating said follower, a bracket supporting said control arm on said tool support, a pivotal connection between said arm and said bracket for adjusting said arm to parallel relation with said lathe axis, and a slidable mounting for said bracket on said tool support providing for adjustment of said arm radially of said axis in accordance with the initial radial setting of said tool.

10. Apparatus for maintaining a constant cutting speed on a workpiece in a lathe having a variable speed drive and including a tool and tool support adjustably mounted on said lathe for movement toward and away from the lathe axis in a selected angular path and provided with means for changing said angular path, comprising a housing adapted to be mounted on said lathe, a movable control member for said variable speed drive in said housing, a follower, a slide supporting said follower for linear movement in said housing radially of the lathe axis, a cam bar pivoted in said housing adjacent the path of said slide, means on said slide for engaging said cam bar to move the same about the pivot therefor in accordance with the movement of said slide, means operatively connecting said cam bar with said control member, and means for connecting said follower with said tool support, said connecting means being adjustable to cause said slide to move radially with respect to said axis at a rate substantially equal to the radial component of the rate of movement of said tool support along each said angular path.

11. Apparatus for maintaining a constant cutting speed on a workpiece in a lathe having a variable speed drive and including a tool and a tool support adjustably mounted on said lathe for movement toward and away from the lathe axis in a selected angular path and provided with means for changing said angular path, comprising a housing adapted to be mounted on said lathe, a movable control member for said variable speed drive in said housing, a slide mounted for linear movement in said housing radially of said lathe axis, said housing having a slot therethrough, a follower mounted on said slide and extending through said slot, means for connecting said follower with said tool support, said connecting means being adjustable to cause said slide to move radially with respect to said axis at a rate substantially equal to the radial component of the rate of movement of said tool support along each said angular path, means operatively connecting said slide with said control member to adjust the drive speed in accordance with the radial position of said follower with respect to said lathe axis, and a flexible sealing strip covering said slot and secured to said slide for movement therewith to seal the interior of said housing.

12. Apparatus for maintaining a constant cutting speed on a workpiece in a lathe having a variable speed drive and including a tool and a tool support adjustably mounted on said lathe for movement toward and away from the lathe axis in a selected angular path and provided with means for changing said angular path, comprising a housing adapted to be mounted on said lathe, a movable control member for said variable speed drive in said housing, a cam bar pivoted in said housing, means including a linkage operatively connecting said cam bar with said control member to cause movement of said control member corresponding to the pivotal movement of said cam bar, a slide mounted for linear movement in said housing radially of said lathe axis, means on said slide for engaging said cam bar to cause pivotal movement thereof in coordinated relation with the linear movement of said slide, and means operatively connecting said slide with said tool support, said connecting means being adjustable to cause said slide to move radially with respect to said axis at a rate substantially equal to the radial component of the rate of movement of said tool support along each said angular path.

13. Apparatus for maintaining a constant cutting speed on a workpiece in a lathe having a variable speed drive and including a tool and a tool support movable at a selected angle with respect to the lathe axis and provided with means for changing said angle, comprising a housing adapted to be mounted on said lathe, a movable control member for said variable speed drive in said housing, a cam bar pivoted in said housing, means operatively connecting said cam bar with said control member to cause movement of said control member corresponding to the pivotal movement of said cam bar, a slide mounted for linear movement in said housing radially of said lathe axis, means on said slide for engaging said cam bar to cause pivotal movement thereof in coordinated relation with the linear movement of said slide, a follower mounted on said slide, a control arm for operating said follower, an adjustable mounting for said arm on said tool support providing for alignment of said arm in parallel relation with said lathe axis in accordance with the angular relation to said axis of the path of movement of said support, and means for adjusting said arm on said tool support radially of said axis in accordance with the initial radial setting of said tool.

References Cited in the file of this patent
UNITED STATES PATENTS

| | | |
|---|---|---|
| 602,449 | Hill | Apr. 19, 1898 |
| 2,080,145 | Maurer | May 11, 1937 |
| 2,088,948 | Crzellitzer | Aug. 3, 1937 |
| 2,169,351 | Bednarek | Aug. 15, 1939 |
| 2,209,037 | Riegger | July 23, 1940 |
| 2,389,368 | King | Nov. 20, 1945 |
| 2,475,326 | Johnson | July 5, 1949 |
| 2,485,716 | Eberlein | Oct. 25, 1949 |
| 2,553,984 | Siekmann | May 22, 1951 |
| 2,559,138 | Waterson | July 3, 1951 |
| 2,586,183 | Stewart | Feb. 19, 1952 |